United States Patent
Matsuo et al.

(10) Patent No.: US 8,662,046 B2
(45) Date of Patent: Mar. 4, 2014

(54) BALANCER INTEGRATED WITH CRANKCASE

(75) Inventors: Masatoshi Matsuo, Atsugi (JP); Hidenori Tasaka, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 328 days.

(21) Appl. No.: 13/276,759

(22) Filed: Oct. 19, 2011

(65) Prior Publication Data

US 2012/0111298 A1 May 10, 2012

(30) Foreign Application Priority Data

Nov. 10, 2010 (JP) ................................. 2010-251439

(51) Int. Cl.
*F02B 75/06* (2006.01)
*F01M 9/10* (2006.01)

(52) U.S. Cl.
USPC .................................. 123/192.2; 123/196 R

(58) Field of Classification Search
USPC ................................ 123/192.2, 195 R, 196 R
See application file for complete search history.

(56) References Cited

U.S. PATENT DOCUMENTS

| 5,791,309 A | 8/1998 | Yamazaki et al. |
| 2009/0064962 A1 | 3/2009 | Ohsawa |

FOREIGN PATENT DOCUMENTS

| JP | 8-128356 A | 5/1996 |
| JP | 9-210135 A | 8/1997 |
| JP | 2004-124792 A | 4/2004 |
| JP | 2006-57540 A | 3/2006 |
| JP | 2009-68364 A | 4/2009 |

OTHER PUBLICATIONS

Japanese Office Action dated Jan. 29, 2013 (two (2) pages).

*Primary Examiner* — Noah Kamen
(74) *Attorney, Agent, or Firm* — Crowell & Moring LLP

(57) ABSTRACT

A balancer integrated with a crankcase of an internal combustion engine, including balance shafts that are driven and rotated by a rotational force transmitted from a crankshaft of the internal combustion engine to the balance shafts through an endless transmission member to reduce second order vibration of the internal combustion engine, a tensioner that applies tension to the endless transmission member by pressing an outer surface of the endless transmission member using a hydraulic pressure, a tensioner mounting portion to which the tensioner is mounted, the tensioner mounting portion being integrally formed with the crankcase, and an oil supply portion projectingly disposed along an outer surface of the tensioner mounting portion and integrally formed with the tensioner mounting portion, the oil supply portion supplying the hydraulic pressure to the tensioner through the tensioner mounting portion.

8 Claims, 10 Drawing Sheets

BALANCER INTEGRATED WITH CRANKCASE

BACKGROUND OF THE INVENTION

The present invention relates to a balancer integrated with a crankcase of an internal combustion engine which is capable of reducing second order vibration that is caused in the internal combustion engine.

Japanese Patent Application Unexamined Publication No. 2009-68364 discloses a balancer integrally coupled to a crankcase that is mounted to a lower portion of a cylinder block of an internal combustion engine. The balancer is constructed such that a rotational force is transmitted from the crankshaft to a drive balance shaft and a driven shaft through a timing chain. The balance shafts have balance weights, respectively, which make a unitary rotation with the balance shafts and serve to effectively reduce second order vibration of the engine. Further, the timing chain always undergoes a constant tension produced by a tensioner that is disposed on the crankcase to thereby enhance transmission ability of transmitting the rotational force from the crankshaft.

SUMMARY OF THE INVENTION

In the conventional balancer as described above, the tensioner always presses an outer circumferential portion of the timing chain, thereby causing a reaction force so that a relatively large load is exerted on side walls of the crankcase outwardly, that is, in an opening direction of the side walls. For this reason, it is necessary to ensure a strength of the crankcase by providing specific reinforcing ribs or increasing a thickness of the side walls of the crankcase.

It is an object of the present invention to solve the above-described technological problem in the conventional art and to provide a balancer integrated with a crankcase which is capable of ensuring strength of the crankcase by utilizing a construction of an oil supply passage through which an oil is supplied to a tensioner.

The other objects and features of this invention will become understood from the following description with reference to the accompanying drawings.

In a first aspect of the present invention, there is provided a balancer integrated with a crankcase of an internal combustion engine, the crankcase having one end portion fixed to a cylinder block, the balancer being disposed between the crankcase and an oil pan, the balancer including:

balance shafts that are driven and rotated by a rotational force transmitted from a crankshaft of the internal combustion engine to the balance shafts through an endless transmission member to reduce second order vibration of the internal combustion engine;

a tensioner that applies tension to the endless transmission member by pressing an outer surface of the endless transmission member using a hydraulic pressure;

a tensioner mounting portion to which the tensioner is mounted, the tensioner mounting portion being integrally formed with the crankcase, and an oil supply portion projectingly disposed along an outer surface of the tensioner mounting portion and integrally formed with the tensioner mounting portion, the oil supply portion supplying the hydraulic pressure to the tensioner through the tensioner mounting portion.

In a second aspect of the invention, there is provided a balancer integrated with a crankcase of an internal combustion engine, the balancer including:

balance shafts that are driven and rotated by a rotational force transmitted from a crankshaft of the internal combustion engine to the balance shafts through a chain to reduce second order vibration of the internal combustion engine;

a tensioner that applies tension to the chain by pressing an outer surface of the chain using a hydraulic pressure;

a tensioner mounting portion to which the tensioner is mounted, the tensioner mounting portion being integrally formed with the crankcase, a passage forming portion disposed on an outer surface of the tensioner mounting portion, the passage forming portion being integrally formed with tensioner mounting portion, and an oil supply passage formed in the passage forming portion, the oil supply passage supplying the hydraulic pressure to the tensioner.

In a third aspect of the invention, there is provided a balancer integrated with a crankcase of an internal combustion engine, the crankcase including opposed side walls each having one end portion fixed to a cylinder block and the other end portion to which an oil pan is fixed, the balancer including:

balance shafts that are driven and rotated by a rotational force transmitted from a crankshaft of the internal combustion engine to the balance shafts through an endless transmission member to reduce second order vibration of the internal combustion engine;

a tensioner that applies tension to the endless transmission member by pressing an outer surface of the endless transmission member using a hydraulic pressure;

a tensioner mounting portion to which the tensioner is mounted, the tensioner mounting portion being integrally formed with the crankcase, a projecting portion disposed between the tensioner mounting portion and an inner surface of one of the side walls of the crankcase, the projecting portion being integrally formed with the tensioner mounting portion and the one of the side walls of the crankcase, an oil supply passage formed in the projecting portion, the oil supply passage supplying the hydraulic pressure to the tensioner, and an oil introducing passage extending from a side of one end wall of the crankcase into the crankcase, the oil introducing passage including a small diameter portion and a large diameter portion that is formed on the side of the one end wall, the large diameter portion being connected with the small diameter portion to form a step therebetween, the oil introducing passage intersecting with the oil supply passage at the large diameter portion, wherein the hydraulic pressure is supplied from the oil introducing passage to the tensioner through the oil supply passage.

DETAILED DESCRIPTION OF THE INVENTION

Referring now to FIGS. 1-10, a balancer integrated with a crankcase, according to an embodiment of the present invention, is explained. In this embodiment, the engine balancer is applied to an in-line four-cylinder internal combustion engine for automobiles. For ease of understanding, various directional terms, such as right, left, upper, lower, rightward and the like are used in the description. However, such terms are to be understood with respect to only a drawing or drawings on which a corresponding part or portion is shown.

Figure 8:
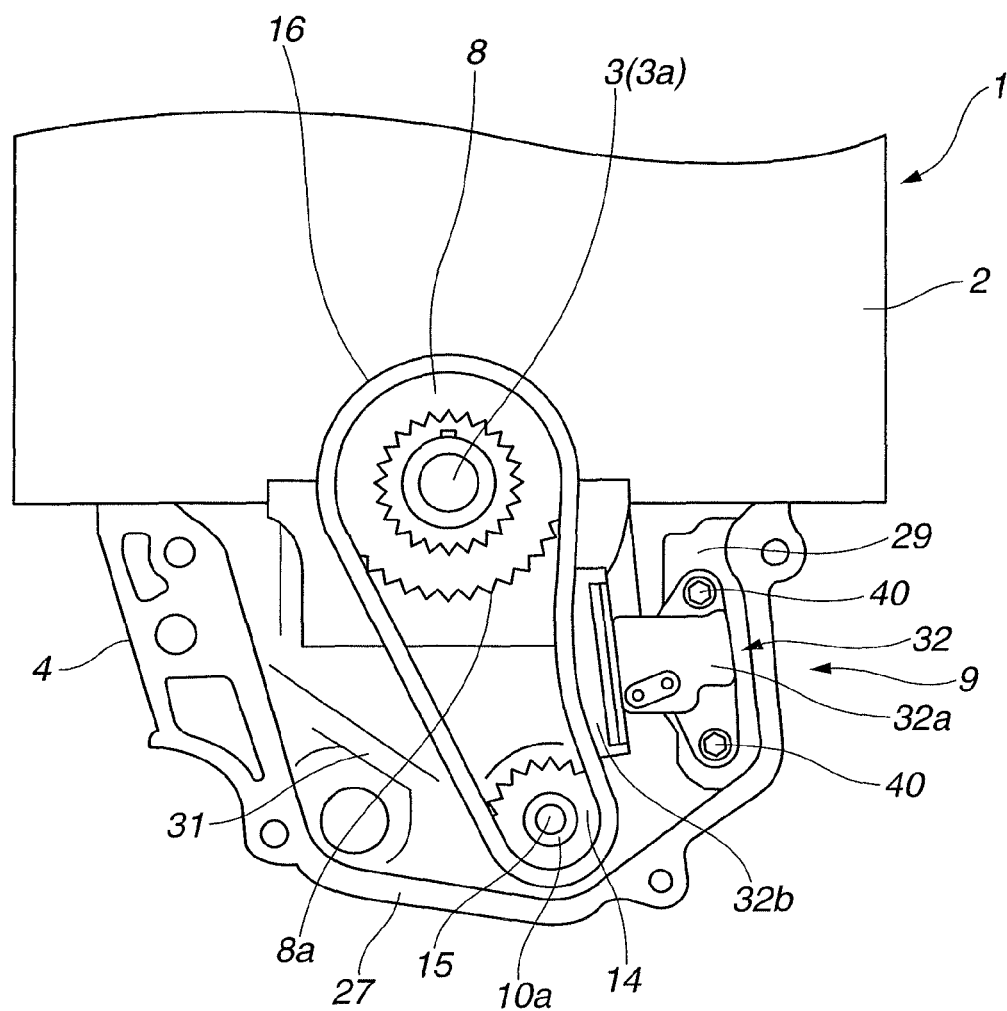
FIG. 8 is a front view of the balancer according to the embodiment mounted to the crankcase of the internal combustion engine.
Figure 9:
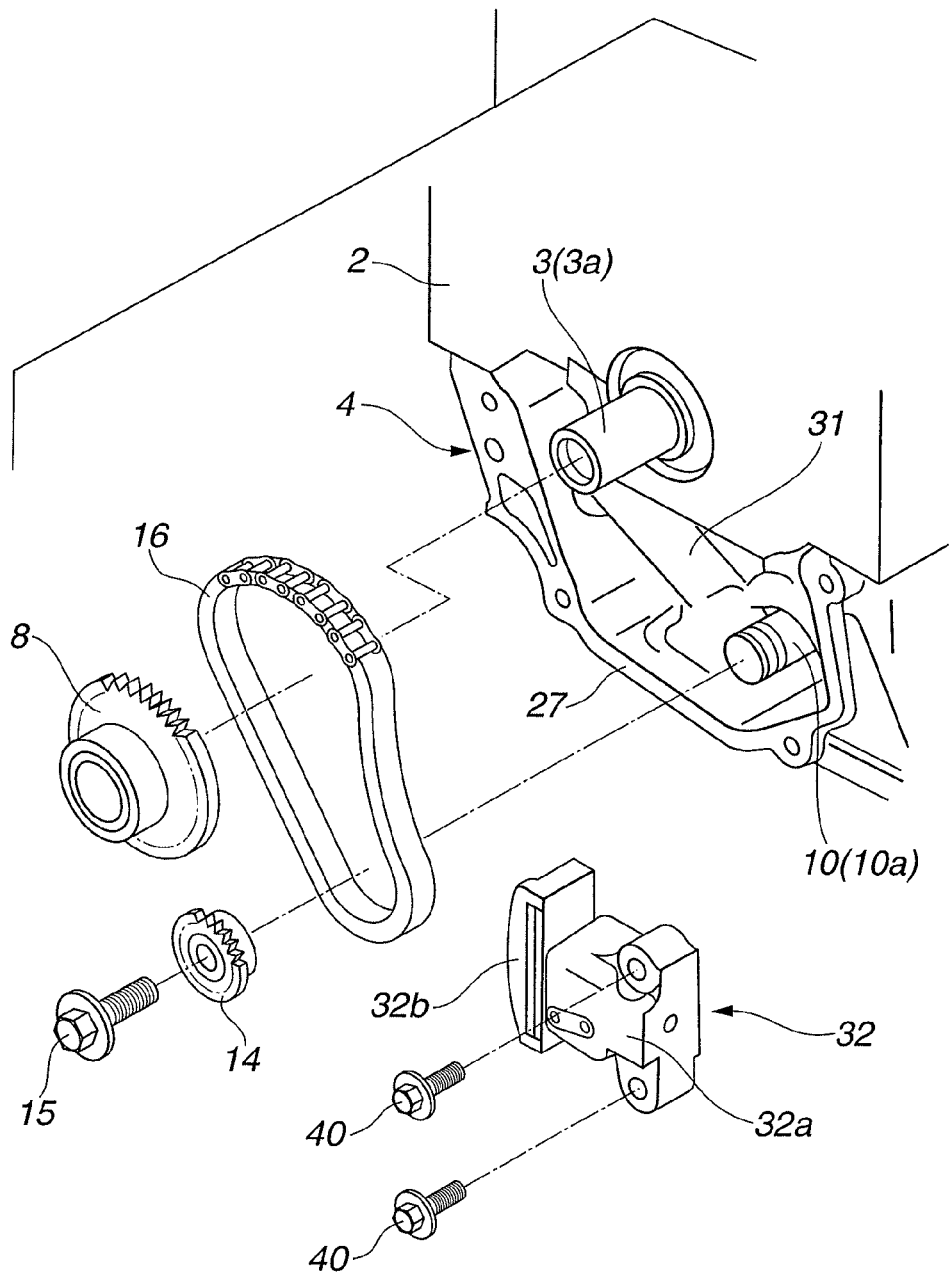
FIG. 9 is an exploded perspective view of a drive side and a hydraulic tensioner of the balancer according to the embodiment.
Figure 10:
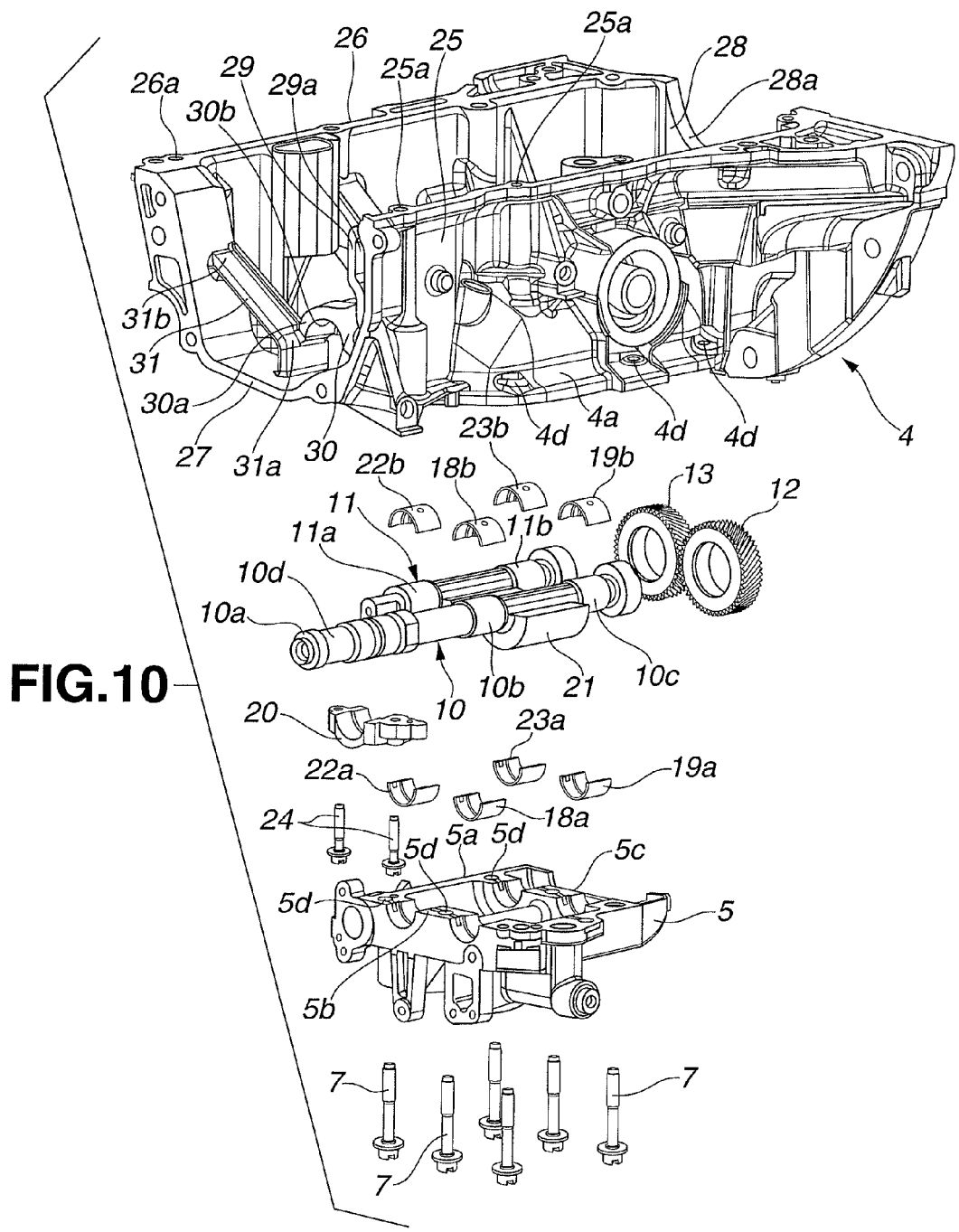
FIG. 10 is an exploded perspective view of the balancer according to the embodiment.

As illustrated in FIG. 8 to FIG. 10, crankcase 4 is fixed to a lower portion of cylinder block 2 of internal combustion engine 1 (hereinafter referred to simply as engine 1). Crankcase 4 includes a bearing portion that supports crankshaft 3, and is made of an aluminum alloy. Lower housing 5 is mounted to a lower portion of crankcase 4 by means of six fastening bolts 7. Also mounted to the lower portion of crankcase 4 is an oil pan, not shown, which covers a lower portion of lower housing 5 and reserves an engine oil therein.

Crankshaft 3 is rotatably supported by a plurality of bearings, not shown, which are each constituted of a bearing cap, etc., and connected to a lower portion of cylinder block 2 by a bearing bolt. Crankshaft 3 includes integral shaft end portion 3a on the side of a front end thereof, to which crank sprocket 8 having a large diameter is mounted.

Crank sprocket 8 is mounted to shaft end portion 3a of crankshaft 3 through an insertion hole that is formed in a central portion of crank sprocket 8. Crank sprocket 8 has gear portion 8a on an outer circumferential surface thereof.

Balancer 9 that suppresses second order vibration of the engine is accommodated in a space surrounded by the lower portion of crankcase 4 and the oil pan.

Figure 1:
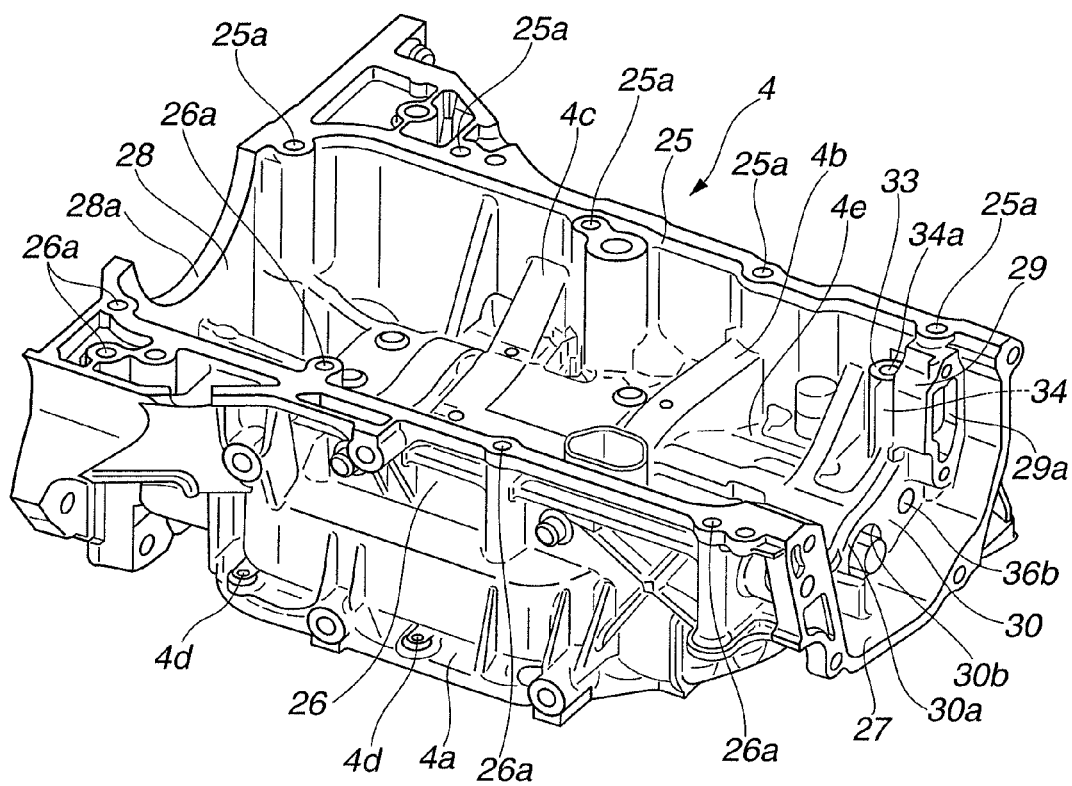
FIG. 1 is a perspective view of a crankcase of an internal combustion engine to which a balancer according to an embodiment of the present invention is integrally connected.

Specifically, as shown in FIG. 1, FIG. 8 and FIG. 10, balancer 9 includes crankcase 4 and lower housing 5 which cooperate with each other to constitute a housing, and drive balance shaft 10 and driven balance shaft 11 as a pair of balance shafts which are rotatably supported between crankcase 4 and lower casing 5. Drive balance shaft 10 and driven balance shaft 11 extend in a forward and rearward direction of engine 1 and are arranged parallel to each other. Further, balancer 9 includes helical drive gear 12 and helical driven gear 13 respectively disposed on the rear end portion of drive balance shaft 10 and the rear end portion of driven balance shaft 11, and meshed with each other.

Figure 4:
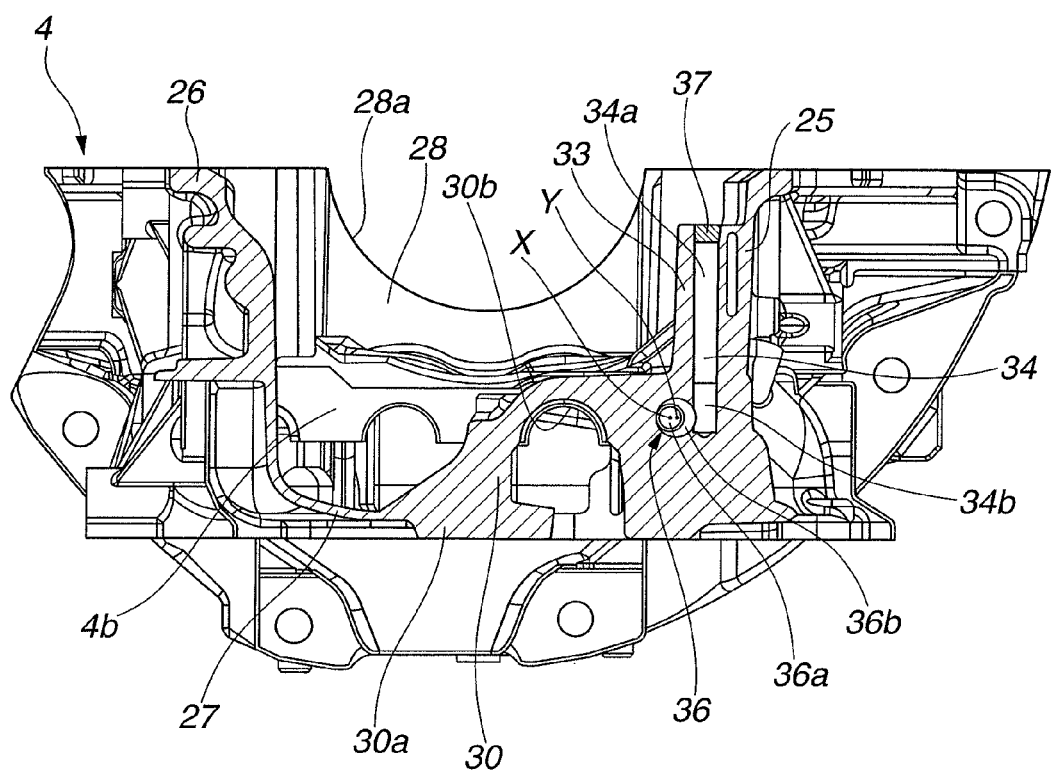
FIG. 4 is a cross-section taken along line A-A shown in FIG. 3.
Figure 5:
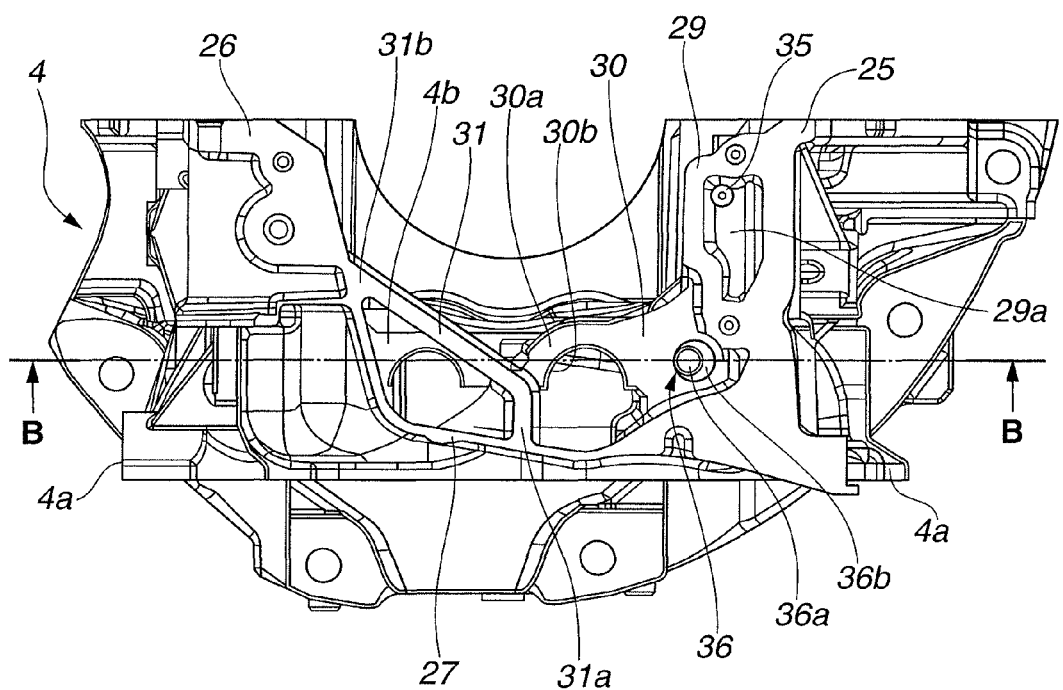
FIG. 5 is a front view of the crankcase shown in FIG. 1.

As seen from FIG. 4, FIG. 5 and FIG. 10, crankcase 4 and lower housing 5 include mating portions that are opposed to each other in a vertical direction and mate with each other. Crankcase 4 includes left and right frame-shaped deck portions 4a, 4a formed on an outer periphery of the mating portion in a spaced relation to each other. Lower housing 5 includes left and right frame-shaped deck portions 5a, 5a formed on an outer periphery of the mating portion in a spaced relation to each other. Deck portions 4a, 4a, 5a, 5a extend along the forward and rearward direction of engine 1. As shown in FIG. 4 to FIG. 6 and FIG. 10, crankcase 4 includes a pair of lateral bridge deck portions 4b, 4c disposed to be spaced from each other in the forward and rearward direction of engine 1. Lateral bridge deck portions 4b, 4c extend so as to cross frame-shaped deck portions 4a, 4a and connect frame-shaped deck portions 4a, 4a with each other. Similarly, lower housing 5 includes a pair of lateral bridge deck portions 5b, 5c disposed to be spaced from each other in the forward and rearward direction of engine 1. Lateral bridge deck portions 5b, 5c extend so as to cross frame-shaped deck portions 5a, 5a and connect frame-shaped deck portions 5a, 5a with each other. Frame-shaped deck portions 4a, 4a, 5a, 5a and lateral bridge deck portions 4b, 4c, 5b, 5c are integrally formed with crankcase 4 and lower housing 5, respectively.

Frame-shaped deck portions 5a, 5a of lower housing 5 have insertion holes 5d formed in predetermined positions at outer peripheries of frame-shaped deck portions 5a, 5a. Fastening bolts 7 for fixing lower housing 5 to crankcase 4 are inserted into insertion holes 5d. On the other hand, frame-shaped deck portions 4a, 4a of crankcase 4 have female threaded holes 4d into which fastening bolts 7 are screwed.

Drive balance shaft 10 has front end portion (or distal end portion) 10a as shown in FIG. 10. As shown in FIG. 8, balance sprocket 14 is fixed onto front end portion 10a by fastening bolt 15 screwed into front end portion 10a in the axial direction thereof. Drive chain 16 in the form of an endless transmission member is wound about balance sprocket 14 and crank sprocket 8, through which a rotational force from crankshaft 3 is transmitted to balance sprocket 14. With this construction, drive balance shaft 10 and driven balance shaft 11 are allowed to rotate in opposite directions through mutually meshing drive gear 12 and driven gear 13.

Drive balance shaft 10 and driven balance shaft 11 are allowed to rotate twice per one rotation of crankshaft 3.

As shown in FIG. 10, drive balance shaft 10 includes cylindrical journals 10b, 10c that are formed at substantially middle portion and the rear end portion of drive balance shaft 10 in an axial direction of drive balance shaft 10, respectively. Journals 10b, 10c are rotatably supported in semi-circular bearing grooves respectively formed in lateral bridge deck portions 4b, 4c of crankcase 4 and lateral bridge deck portions 5b, 5c of lower housing 5 in an opposed relation to each other, through two pairs of lower and upper plain bearings 18a, 18b, 19a, 19b. Further, drive balance shaft 10 includes journal 10d on the side of front end portion 10a which is rotatably supported though bearing cap 20 and a bearing groove formed on the lower portion of crankcase 4. Bearing cap 20 is fixed to the lower portion of crankcase 4 by two bearing bolts 24.

Balance weight 21 having a semi-circular shape in front view is disposed between two journals 10b, 10c of drive balance shaft 10 and integrally connected with drive balance shaft 10.

Drive gear 12 is fixed to the large-diameter rear end portion of drive balance shaft 10 by a suitable method such as press fitting.

On the other hand, driven balance shaft 11 has an axial length smaller than that of drive balance shaft 10. Driven balance shaft 11 includes journals 11a, 11b formed at a front end portion and the rear end portion of driven balance shaft 11 in an axial direction of driven balance shaft 11, respectively. Journals 11a, 11b are rotatably supported in semi-circular bearing grooves respectively formed in lateral bridge deck portions 4b, 4c of crankcase 4 and lateral bridge deck portions 5b, 5c of lower housing 5 in an opposed relation to each other, through two pairs of lower and upper plain bearings 22a, 22b, 23a, 23b.

Further, driven balance shaft 11 has a semi-circular balance weight (not shown) that is disposed between journals 11a, 11b and integrally connected to driven balance shaft 11.

Driven gear 13 is fixed to the large-diameter rear end portion of driven balance shaft 11 by a suitable method such as press fitting.

Crankcase 4 has a generally U-shape in front view and includes opposed side walls 25, 26 extending upwardly from frame-shaped deck portions 4a, 4a, substantially curved bridge wall 27 that connects side walls 25, 26, and rear end wall 28 integrally formed on a rear end portion of crankcase 4. Bridge wall 27 is a thinned wall having a small wall thickness and extends between opposed inner surfaces of lower portions of a front end portion of side walls 25, 26.

Specifically, side walls 25, 26 include a plurality of bolt insertion holes 25a, 26a formed in upper portions of side walls 25, 26 in predetermined positions spaced from each other in the forward and rearward direction of crankcase 4. A plurality of bolts (not shown) are inserted into bolt insertion holes 25a, 26a to thereby fix crankcase 4 to cylinder block 2.

Further, as shown in FIG. 1 to FIG. 6, thickened support wall 29 that serves as a tensioner mount portion is integrally connected with the inner surface of the front end side of one side wall 25. Support wall 29 has a generally rectangular shape, and has a lower portion integrally connected with an upper surface of bridge wall 27.

Rear end wall 28 has a thickened plate shape, and has right and left side edges integrally connected with the opposed inner surfaces of side walls 25, 26. Further, rear end wall 28 has bearing groove 28a at a substantially middle portion of an upper end edge thereof. Bearing groove 28a has a semi-circular shape in front view and supports a bearing for crankshaft 3.

Support wall 29 supports hydraulic tensioner 32 as explained later and has oil supply chamber 29a therein as best shown in FIG. 1. Support wall 29 includes reinforcing rib 30 that is integrally formed on the lower portion of support wall 29. Reinforcing rib 30 has a lower end edge connected to the upper surface of bridge wall 27. As shown in FIG. 1 and FIG. 5, reinforcing rib 30 extends along the upper surface of bridge wall 27 toward side wall 26, and has distal end portion 30a whose tip end edge is connected to an upper side of one end portion 31a of bridge 31 as explained later. Further, reinforcing rib 30 has semi-circular cutout 30b in a lower portion of distal end portion 30a into which front end portion 10a of drive balance shaft 10 is inserted.

As shown in FIG. 5, bridge 31 having a generally reversed V-shape is disposed on an opposite side of reinforcing rib 30 of bridge wall 27. Bridge 31 has one end portion 31a connected to a substantially middle portion of the upper surface of bridge wall 27 in a lateral direction perpendicular to the forward and rearward direction of crankcase 4, and the other end portion 31b connected to a substantially middle portion of the inner surface of side wall 26 in an upward and downward direction of side wall 26. Bridge 31 and bridge wall 27 cooperate with each other to form a generally triangular space therebetween into which driven balance shaft 11 is exposed.

As shown in FIG. 8 and FIG. 9, hydraulic tensioner 32 is mounted to a front end portion of support wall 29, which presses an outer surface of drive chain 16 at a given load to thereby apply a tension to drive chain 16.

As shown in FIG. 8 and FIG. 9, hydraulic tensioner 32 includes tensioner body 32a fixed to the front end portion of support wall 29 by a pair of bolts 40, and pressing portion 32b disposed on one side of tensioner body 32a. Tensioner body 32a accommodates therein a hydraulic chamber (not shown) to which an oil is supplied from oil supply chamber 29a in support wall 29. Further, tensioner body 32a includes a spring member that bias pressing portion 32b toward drive chain 16 at a predetermined load in cooperation with the hydraulic pressure within the hydraulic chamber.

As shown in FIG. 1 to FIG. 4, passage forming portion 33 that serves as an oil supply portion is disposed between support wall 29 and the inner surface of one side wall 25. Specifically, passage forming portion 33 is projectingly disposed on a rear surface of support wall 29 and integrally formed with support wall 29. Passage forming portion 33 as the projecting portion has a generally cylindrical shape extending in the upward and downward direction. As shown in FIG. 4, small-diameter cylindrical oil supply passage 34 is formed in passage forming portion 33, and extends in the upward and downward direction of passage forming portion 33.

Figure 2:
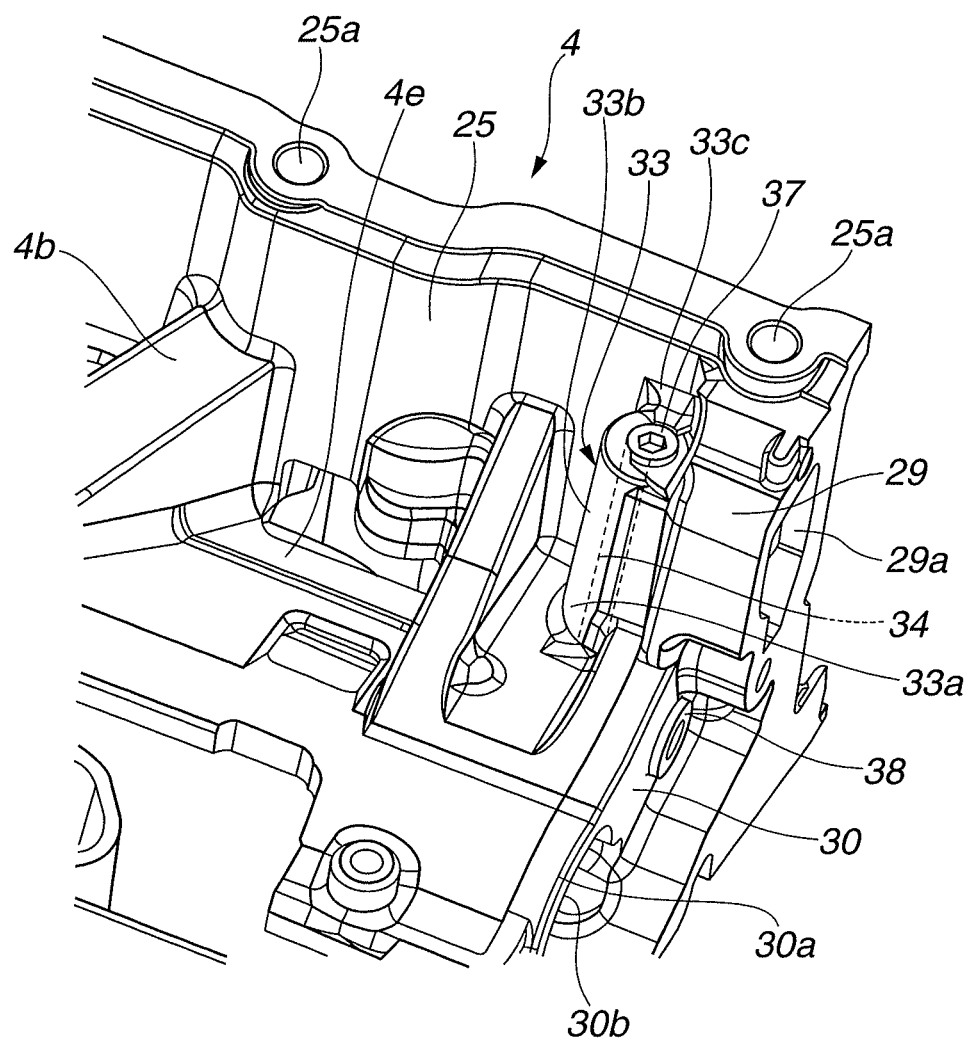
FIG. 2 is an enlarged perspective view of an essential part of the crankcase shown in FIG. 1.
Figure 3:
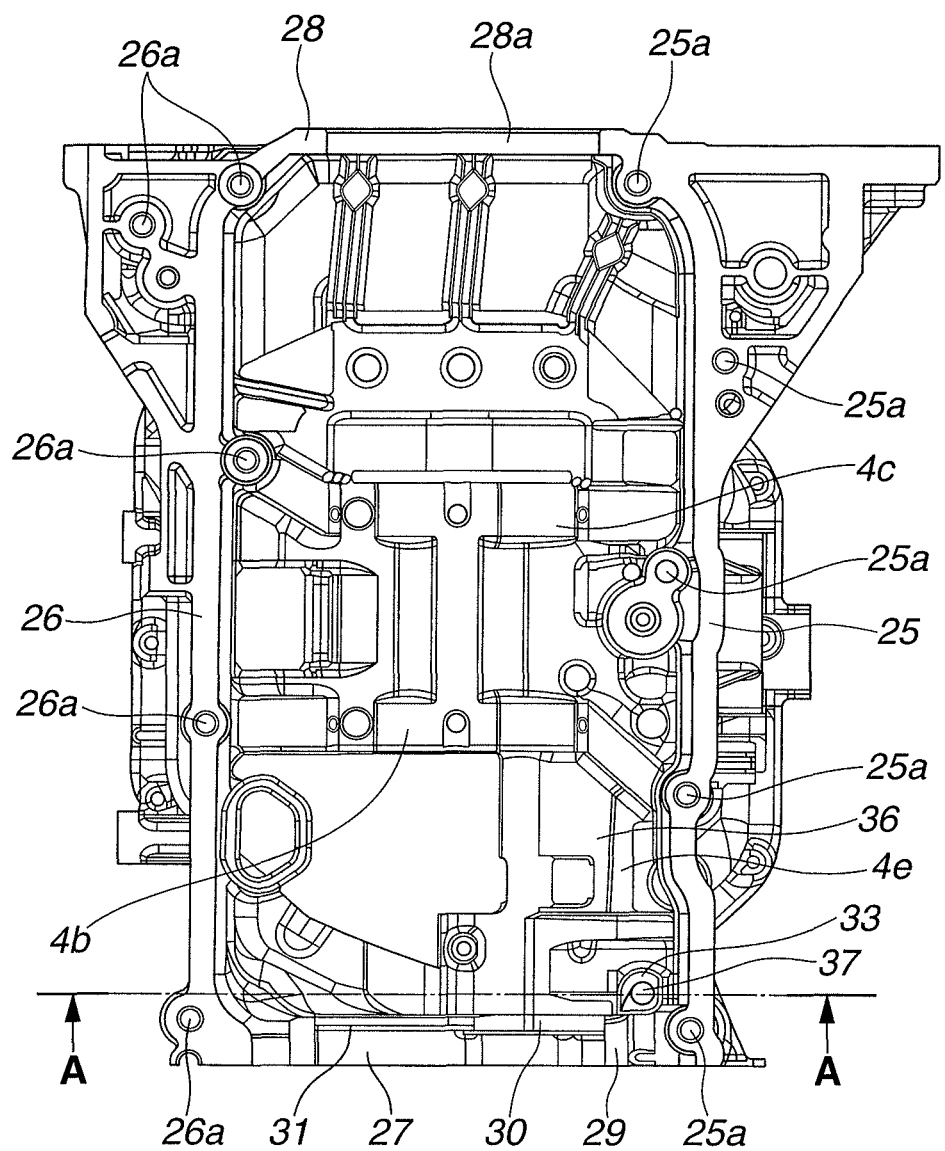
FIG. 3 is a plan view of the crankcase shown in FIG. 1.

Passage forming portion 33 has lower end portion 33a integrally connected to the upper surface of bridge wall 27 of crankcase 4 in order to ensure connection between oil supply passage 34 and oil introducing passage 36 as explained later. Passage forming portion 33 extends from the upper surface of bridge wall 27, and outer circumferential surface 33b of passage forming portion 33 is partially integrally connected with support wall 29. As shown in FIG. 2, passage forming portion 33 includes connecting portion 33c integrally connected to an outer circumferential surface 33b. Passage forming portion 33 is connected to one side wall 25 though connecting portion 33c over an entire region extending along the inner surface of one side wall 25 in the upward and downward direction.

Figure 7:
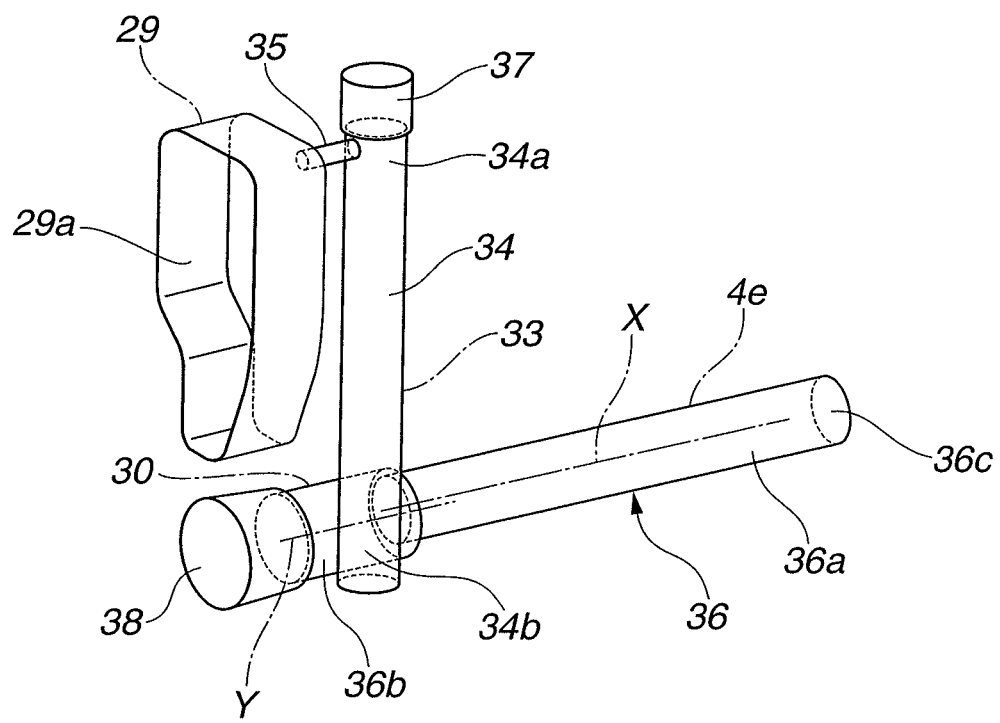
FIG. 7 is a schematic diagram showing an oil supply passage, an oil introduction passage and an oil supply chamber of the balancer according to the embodiment.

As schematically shown in FIG. 7, oil supply passage 34 has upper end portion 34a communicated with oil supply chamber 29a through oil hole 35 that continuously extends in an upper portion of passage forming portion 33 and an upper portion of support wall 29. Lower end portion 34a of oil supply passage 34 is communicated with oil introducing passage 36 partially formed in second passage forming portion 4e that is integrally formed with a lower-inside portion of one side wall 25 along a longitudinal direction of side wall 25.

Oil supply passage 34 is formed to extend from an upper end of passage forming portion 33 downwardly by drilling. An upper open end of oil supply passage 34 is hermetically sealed by sealing plug 37.

Figure 6:
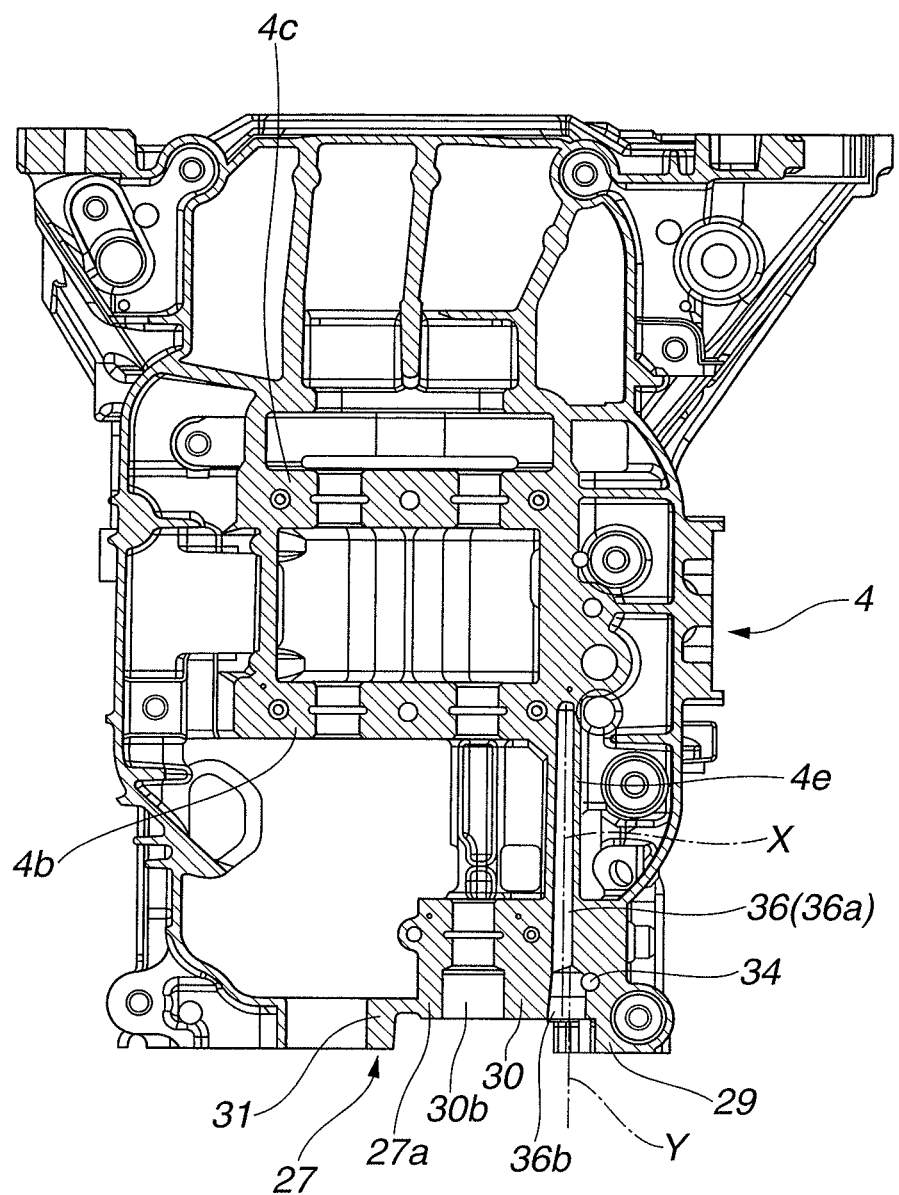
FIG. 6 is a cross-section taken along line B-B shown in FIG. 5.

As shown in FIG. 6, oil introducing passage 36 continuously extends in second passage forming portion 4e and reinforcing rib 30. Oil introducing passage 36 extends substantially parallel to drive balance shaft 10, and includes main passage 36a having a small diameter and large diameter end portion 36b having a diameter larger than that of main passage 36a. Oil introducing passage 36 is communicated with oil holes of plain bearings 18a, 18b, 19a, 19b of drive balance shaft 10 and plain bearings 22a, 22b, 23a, 23b of driven balance shaft 11 through a plurality of oil holes (not shown) formed in lateral bridge deck portions 4c, 4b.

Large diameter end portion 36b is located on the side of reinforcing rib 30 and connected with main passage 36a to form a step therebetween. Oil supply passage 34 is connected with large diameter end portion 36b in a direction substantially perpendicular to oil introducing passage 36. That is, oil introducing passage 36 intersects with oil supply passage 34 at large diameter end portion 36b. The other end portion 36c of oil introducing passage 36 is communicated with a discharge passage of an oil pump (not shown).

As shown in FIG. 4 to FIG. 6, main passage 36a and large diameter end portion 36b are formed such that central axis X of main passage 36a and central axis Y of large diameter end portion 36b are offset from each other for reasons of layout of these passages. Central axis Y of large diameter end portion 36b is located closer to the outside of crankcase 4, that is, closer to side wall 25, than central axis X of main passage 36a.

Further, lower end portion 34b of oil supply passage 34 is connected with large diameter end portion 36b not in a direction of central axis Y of large diameter end portion 36b but intersecting with large diameter end portion 36b substantially along a direction of a tangent of large diameter end portion 36b for reasons of layout of these passages. Large diameter end portion 36b extends through reinforcing rib 30 to be opened to a front end surface of reinforcing rib 30. The open end of large diameter end portion 36b is hermetically sealed by sealing plug 38.

The oil pump is disposed in balancer 9, and operated to suck an oil reserved in the oil pan and discharge the oil into a main oil gallery so that the oil serves for lubrication of sliding parts of engine 1. On the other hand, a part of the oil supplied to the main oil gallery is fed to oil introducing passage 36, and then supplied from oil introducing passage 36 to oil supply chamber 29a through oil supply passage 34 and oil hole 35 to thereby serve for producing a pressing force of hydraulic tensioner 32.

The oil introduced into oil introducing passage 36 is supplied to not only oil supply passage 34 but also plain bearings 18a, 18b, 19a, 19b of drive balance shaft 10 and plain bearings 22a, 22b, 23a, 23b of driven balance shaft 11 through oil holes.

In thus constructed balancer 9, when engine 1 is started and crankshaft 3 is rotationally driven, drive balance shaft 10 is rotated in one direction at a double speed of crankshaft 3 through crank sprocket 8, drive chain 16 and balance sprocket 14. The rotation of drive balance shaft 10 is transmitted to driven balance shaft 11 through meshing engagement of drive gear 12 and driven gear 13, so that driven balance shaft 11 is rotated at the same speed as that of drive balance shaft 10 in a direction opposite to the one direction of drive balance shaft 10.

Accordingly, respective balance weights 21 on the drive side and the driven side are rotated in opposite directions, thereby cancelling centrifugal forces generated in respective balance shafts 10, 11 in the opposite directions. Thus, respective balance weights 21 are rotated in accordance with the rotation of respective balance shafts 10, 11, and transmits a vibromotive force to engine 1 to thereby suppress second order vibration.

Further, in balancer 9 according to this embodiment, bridge wall 27, reinforcing rib 30, bridge 31 and support wall 29 are connected to each other between opposed side walls 25, 26 in the lateral direction (i.e., the rightward and leftward direction) of crankcase 4. With this construction, connecting force generated between side walls 25, 26 is increased to thereby enhance rigidity of the front end side of crankcase 4. That is, strength of crankcase 4 to a load that is exerted on side walls 25, 26 in an opening direction of side walls 25, 26 (i.e., in an outward direction thereof) becomes larger. As a result, it is possible to suppress occurrence of vibration of crankcase 4 which is caused upon driving crankshaft 3 and balancer 9, and noise caused due to the vibration.

Further, passage forming portion 33 is connected to one side wall 25 and support wall 29, thereby serving as a reinforcing member relative to one side wall 25 to thereby increase the strength of one side wall 25. With the arrangement of passage forming portion 33, even in a case where a large load caused by a reaction force of drive chain 16 to the pressing force of hydraulic tensioner 32 is exerted on one side wall 25 through support wall 29 in the opening direction, passage forming portion 33 can reinforce one side wall 25 to thereby surely suppress deformation of one side wall 25 in the opening direction.

Particularly, as described above, lower end portion 33a of passage forming portion 33 is integrally connected to bridge wall 27, and a part of outer circumferential surface 33b of passage forming portion 33 is connected to support wall 29 and the inner surface of side wall 25 over the entire region thereof extending along the inner surface of one side wall 25 in the upward and downward direction. With this construction, the rigidity of one side wall 25 in the opening direction can be more increased. As a result, one side wall 25 can be sufficiently resistant to the load caused by the reaction force of drive chain 16 to the pressing force of hydraulic tensioner 32. In addition, vibration of crankcase 4 which is caused upon driving crankshaft 3 and balancer 9, and noise caused due to the vibration can be more effectively suppressed.

Thus, passage forming portion 33 can sufficiently function as the reinforcing member. Accordingly, it is not necessary to provide ribs that reinforce support wall 29 and one side wall 25, thereby serving for reduction in production cost. Further, it is not necessary to increase a thickness of one side wall 25 itself.

Further, since passage forming portion 33 has a relatively large outer diameter as compared to a diameter of oil supply passage 34, passage forming portion 33 serving as the reinforcing member can ensure sufficient strength.

Further, since second passage forming portion 4e that forms oil introducing passage 36 is integrally formed with one side wall 25 along the longitudinal direction of side wall 25, second passage forming portion 4e can serve as a reinforcing member that reinforces one side wall 25 in the opening direction. With this construction, second passage forming portion 4e can further increase the strength of crankcase 4 in cooperation with passage forming portion 33.

Further, oil supply passage 34 and oil introducing passage 36 are formed by drilling after crankcase 4 is formed by casting. Therefore, the forming process of oil supply passage 34 and oil introducing passage 36 can be facilitated.

Further, oil introducing passage 36 allows both supply of the oil (lubricating oil) to plain bearings 18a, 18b, 19a, 19b of drive balance shaft 10 and plain bearings 22a, 22b, 23a, 23b of driven balance shaft 11, and supply of the oil (oil pressure) to hydraulic tensioner 32. Therefore, the oil supply can be efficiently carried out by using a single passage. Further, since a complicated passage construction is not necessary, the production cost can be reduced.

The present invention is not limited to the above-described embodiment. For instance, a drive belt may be used as the endless transmission member instead of drive chain 16. Furthermore, passage forming portion 33 may be modified in shape of the cross section such that the reinforcing effect can be enhanced. For instance, the shape of the cross section may be a triangular shape, a rectangular shape, etc., other than the circular shape.

Other technical concepts and effects of the present invention which are understandable from the above embodiment are described as follows.

(a) In a fourth aspect of the present invention, there is provided the balancer according to the first aspect, wherein the oil supply portion is integrally formed with a side wall of the crankcase along an inner surface of the side wall. With this construction, strength of the crankcase can be increased.

(b) In a fifth aspect of the present invention, there is provided the balancer according to the fourth aspect, wherein the large diameter portion of the oil introducing passage has a central axis offset from a central axis of a small diameter portion of the oil introducing passage.

(c) In a sixth aspect of the present invention, there is provided the balancer according to the fifth aspect, wherein the oil introducing passage extends parallel to the balance shaft and supplies a pressurized oil fed from an oil pump, to bearings of the balance shafts.

In the balancer according to the present invention, the oil introducing passage allows both supply of the oil (lubricating oil) to the respective bearings of the balance shafts, and supply of the oil (oil pressure) to the oil tensioner. With this construction, the oil supply can be efficiently carried out by using a single passage. Further, a complicated passage construction is not necessary, so that the production cost can be reduced.

(d) In a seventh aspect of the present invention, there is provided the balancer according to the fourth aspect, wherein a sealing plug is fixed to an open end of the oil supply passage.

(e) In an eighth aspect of the present invention, there is provided the balancer according to the fourth aspect, wherein a sealing plug is fixed to an open end of the large diameter portion of the oil supply passage.

This application is based on a prior Japanese Patent Application No. 2010-251439 filed on Nov. 10, 2010. The entire contents of the Japanese Patent Application No. 2010-251439 is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A balancer integrated with a crankcase of an internal combustion engine, the crankcase having one end portion fixed to a cylinder block, the balancer being disposed between the crankcase and an oil pan, the balancer comprising:
   balance shafts that are driven and rotated by a rotational force transmitted from a crankshaft of the internal combustion engine to the balance shafts through an endless transmission member to reduce second order vibration of the internal combustion engine;
   a tensioner that applies tension to the endless transmission member by pressing an outer surface of the endless transmission member using a hydraulic pressure;
   a tensioner mounting portion to which the tensioner is mounted, the tensioner mounting portion being integrally formed with the crankcase, and
   an oil supply portion projectingly disposed along an outer surface of the tensioner mounting portion and integrally formed with the tensioner mounting portion, the oil supply portion supplying the hydraulic pressure to the tensioner through the tensioner mounting portion.

2. The balancer as claimed in claim 1, wherein the oil supply portion is integrally formed with a side wall of the crankcase along an inner surface of the side wall.

3. A balancer integrated with a crankcase of an internal combustion engine, the balancer comprising:
   balance shafts that are driven and rotated by a rotational force transmitted from a crankshaft of the internal combustion engine to the balance shafts through a chain to reduce second order vibration of the internal combustion engine;
   a tensioner that applies tension to the chain by pressing an outer surface of the chain using a hydraulic pressure;
   a tensioner mounting portion to which the tensioner is mounted, the tensioner mounting portion being integrally formed with the crankcase,
   a passage forming portion disposed on an outer surface of the tensioner mounting portion, the passage forming portion being integrally formed with tensioner mounting portion, and
   an oil supply passage formed in the passage forming portion, the oil supply passage supplying the hydraulic pressure to the tensioner.

4. A balancer integrated with a crankcase of an internal combustion engine, the crankcase including opposed side walls each having one end portion fixed to a cylinder block and the other end portion to which an oil pan is fixed, the balancer comprising:
   balance shafts that are driven and rotated by a rotational force transmitted from a crankshaft of the internal combustion engine to the balance shafts through an endless transmission member to reduce second order vibration of the internal combustion engine;
   a tensioner that applies tension to the endless transmission member by pressing an outer surface of the endless transmission member using a hydraulic pressure;
   a tensioner mounting portion to which the tensioner is mounted, the tensioner mounting portion being integrally formed with the crankcase,
   a projecting portion disposed between the tensioner mounting portion and an inner surface of one of the side walls of the crankcase, the projecting portion being integrally formed with the tensioner mounting portion and the one of the side walls of the crankcase,
   an oil supply passage formed in the projecting portion, the oil supply passage supplying the hydraulic pressure to the tensioner, and
   an oil introducing passage extending from a side of one end wall of the crankcase into the crankcase, the oil introducing passage including a small diameter portion and a large diameter portion that is formed on the side of the one end wall, the large diameter portion being connected with the small diameter portion to form a step therebetween, the oil introducing passage intersecting with the oil supply passage at the large diameter portion,
   wherein the hydraulic pressure is supplied from the oil introducing passage to the tensioner through the oil supply passage.

5. The balancer as claimed in claim 4, wherein the large diameter portion of the oil introducing passage has a central axis that is offset from a central axis of the small diameter portion of the oil introducing passage.

6. The balancer as claimed in claim 5, wherein the oil introducing passage extends parallel to the balance shafts and supplies a pressurized oil fed from an oil pump to bearings of the balance shafts.

7. The balancer as claimed in claim 4, wherein a sealing plug is fixed to an open end of the oil supply passage.

8. The balancer as claimed in claim 4, wherein a sealing plug is fixed to an open end of the large diameter portion of the oil introducing passage.

* * * * *